United States Patent
Dunlap et al.

(10) Patent No.: US 6,760,799 B1
(45) Date of Patent: Jul. 6, 2004

(54) REDUCED NETWORKING INTERRUPTS

(75) Inventors: Randall D. Dunlap, Portland, OR (US); Patrick L. Connor, Portland, OR (US); John A. Ronciak, Beaverton, OR (US); Greg D. Cummings, Portland, OR (US); Gary G. Li, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/409,626

(22) Filed: Sep. 30, 1999

(51) Int. Cl.[7] .................. G06F 13/24; G06F 13/26; G06F 13/32; G06F 13/34

(52) U.S. Cl. .................. 710/260; 710/18; 710/48; 710/52; 710/261; 710/262; 710/263; 710/264; 710/266; 710/268; 718/101; 712/244

(58) Field of Search .................. 710/260, 261, 710/262, 263, 264, 266, 268, 47, 48, 52, 59, 18; 709/101; 712/244

(56) References Cited

U.S. PATENT DOCUMENTS

| | | | | |
|---|---|---|---|---|
| 5,161,226 A | * | 11/1992 | Wainer | 710/264 |
| 5,163,152 A | * | 11/1992 | Okamoto | 710/260 |
| 5,218,703 A | * | 6/1993 | Fleck et al. | 710/264 |
| 5,317,747 A | * | 5/1994 | Mochida et al. | 710/260 |
| 5,363,506 A | * | 11/1994 | Fukuoka | 710/267 |
| 5,606,703 A | * | 2/1997 | Brady et al. | 710/264 |
| 5,708,814 A | * | 1/1998 | Short et al. | 710/260 |
| 5,768,630 A | * | 6/1998 | Kim | 710/71 |
| 5,842,078 A | * | 11/1998 | Togashi et al. | 710/48 |
| 5,881,296 A | * | 3/1999 | Williams et al. | 710/263 |
| 5,905,913 A | * | 5/1999 | Garrett et al. | 710/49 |
| 5,983,275 A | * | 11/1999 | Ecclesine | 709/231 |
| 6,021,446 A | * | 2/2000 | Gentry, Jr. | 709/315 |
| 6,038,607 A | * | 3/2000 | Hamilton et al. | 709/236 |
| 6,065,089 A | * | 5/2000 | Hickerson et al. | 710/266 |
| 6,070,219 A | * | 5/2000 | McAlpine et al. | 710/263 |
| 6,115,779 A | * | 9/2000 | Haubursin et al. | 710/262 |
| 6,195,725 B1 | * | 2/2001 | Luhmann | 710/266 |
| 6,219,727 B1 | * | 4/2001 | Kailash et al. | 710/48 |
| 6,233,643 B1 | * | 5/2001 | Andrews et al. | 710/316 |
| 6,266,732 B1 | * | 7/2001 | Chen et al. | 710/263 |
| 6,351,785 B1 | * | 2/2002 | Chen et al. | 710/263 |
| 6,370,607 B1 | * | 4/2002 | Williams et al. | 710/262 |
| 6,389,526 B1 | * | 5/2002 | Keller et al. | 712/30 |
| 6,467,008 B1 | * | 10/2002 | Gentry et al. | 710/261 |
| 6,615,342 B1 | * | 9/2003 | Bopardikar et al. | 712/227 |

FOREIGN PATENT DOCUMENTS

| | | | | | |
|---|---|---|---|---|---|
| JP | 02177074 A | * | 7/1990 | | G11B/27/10 |
| JP | 10097481 A | * | 4/1998 | | G06F/13/00 |

* cited by examiner

*Primary Examiner*—Jeffrey Gaffin
*Assistant Examiner*—Tanh Q Nguyen
(74) *Attorney, Agent, or Firm*—Steven D. Yates

(57) ABSTRACT

An apparatus and method for reducing operating system interrupts by queuing incoming network traffic units received by a network interface, where said units are received without interrupting a host environment on receiving queued units. However, if a predetermined number of received units have a same origin, then the host environment is interrupted as subsequent network traffic units are received by the network interface, until a predetermined number of network traffic units are subsequently received from a different origin. Notwithstanding queuing incoming network traffic units, the host environment is interrupted on expiration of a timeout period, or if a predetermined number of units have been queued.

15 Claims, 6 Drawing Sheets

REDUCED NETWORKING INTERRUPTS

FIELD OF THE INVENTION

The invention generally relates to networking, and more particularly to reducing the number of interrupts presented to a host environment when network traffic is received.

BACKGROUND

Traditionally, when network traffic units (e.g., Ethernet packets, or network traffic packaged in a different format), are received by a network interface card (NIC), an interrupt is generated to a host environment to have the environment immediately process the received network traffic. (The term "network traffic" is used to generally reference a sequence or flow one or more network traffic units received by a network interface.) Typical host environments include computers running a host operating system (OS) such as Microsoft Windows, Novell NetWare, or Unix, as well as dedicated devices controlled by a device-specific OS. Since network traffic can occur regularly, and in significant volume, the interruptions to the host environment can cause a significant slow down of the host environment. This slow down is because interruptions affect the ability of a host CPU to execute other processes, e.g., interactive user sessions or other host programs and services, in a timely manner.

A partial solution to this problem has been to off-load from the host CPU some of the work required for processing network traffic. An example of a NIC which offloads work from the CPU is the EtherExpress™ PRO/100 Smart Adapter by Intel Corporation of Santa Clara, Calif. These NICs include an on-board Intel i960 processor that off-loads the host CPU, and enables part of the normal host device driver functions to run on the NIC. The on-board processor reduces interrupt overhead to the host CPU. (Note that all marks referenced herein are the property of their respective owners.)

Unfortunately, experience has shown that the intelligent NIC can only partially offload the work involved in processing incoming network traffic from the host environment. Although this is a significant improvement over standard totally interrupt-based NICs, which leave all processing to the host environment, there is still significant room for improvement.

SUMMARY

A system, which includes a host environment and network interface, for receiving network traffic units. A queue is utilized to queue a first network traffic unit received from a first origin, and a buffer is utilized to store a second network traffic unit received from a second origin. A comparator compares said first and second origins, and if they differ, then said second unit is queued in the queue. If they equate, a host processor is interrupted for said second unit and subsequent network traffic units received from said second origin. Related methods for receiving network traffic units are disclosed.

BRIEF DESCRIPTION OF THE DRAWINGS

Features and advantages of the invention will become apparent to one skilled in the art to which the invention pertains from review of the following detailed description and claimed embodiments of the invention, in conjunction with the drawings in which:

GLOSSARY

The following definitions and assumptions apply in the following detailed description. A host environment means a computing device having a central processing unit (e.g., a processor), a memory, a network interface, and a host operating system (OS). In a network communication context, the expression "interrupting the host processor" means to direct the host processor to act on network traffic that has been received by the network interface. In a multithreaded OS, the interruption may result in spawning a new high-priority thread to service the request, with an OS context switch to direct processing to this new thread; in a single-tasking OS (or some multitasking OS configurations), all OS activities are temporarily suspended to service the interruption.

A network interface includes (but is not limited to) network interface cards (NICs) such as Ethernet LAN adapters, as well as other communication arrangements over which input and output (I/O) may be performed. Other communication arrangements include networking over communication channels such as Universal Serial Bus (USB), FireWire (Institute of Electrical and Electronics Engineers (IEEE) 1394), Fibre Channel Arbitrated Loop (FC-AL), High Performance Parallel Interface (HIPPI), and parallel/serial ports.

The network interface is assumed to have associated processor(s), memory(s), and timer(s), flash RAM, 82557 Ethernet MAC, etc., either on-board or closely-tied to the interface. The interface is expected to asynchronously (e.g., in parallel with the host environment) execute program code stored in an interface memory for handling incoming and/or outgoing network traffic. The network interface can communicate with the host environment over one or more local buses.

A driver is a program that controls and/or interfaces a device to an operating system and other application programs. In one embodiment, network communication follows the seven-layer Open Systems Interconnection (OSI) Reference Model promulgated in 1983 by the International Standards Organization (ISO). The seven layers are the physical, data link, network, transport, session, presentation, and application layers; each higher layer represents a successive level of complexity and data-abstraction for an underlying raw data stream. The lowest physical layer is the network interface itself; it transmits and receives raw data over a network medium. A network interface driver sits above the physical layer, e.g., in the data link layer, and is responsible for presenting network traffic in a format suitable for the particular network interface being driven. The network interface driver is also responsible packaging network traffic, received by the interface for the network layer, in a format suitable for the next higher network layer.

DETAILED DESCRIPTION

Figure 1:
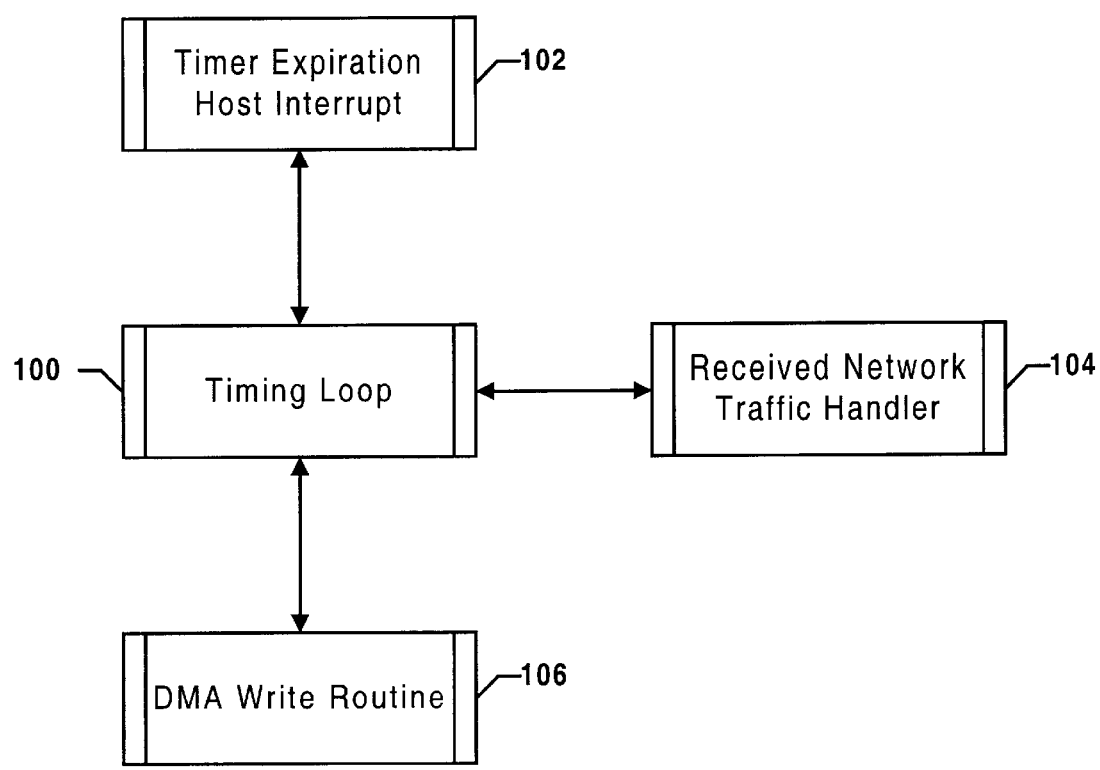
FIG. 1 illustrates overall data flow between program components of one embodiment of the invention.

FIG. 1 illustrates one configuration for software for operating a network interface. Illustrated are a timer loop 100, timer-expiration host interrupt 102, receive unit interrupt loop 104, and DMA complete handler 106. (Recall that the term "unit" refers to a basic portion of network traffic, such as an Ethernet packet.) These features will be generally described with respect to FIG. 1, and then described in more detail below with reference to the remaining figures. Note that even though these features are described as four separate components 100–106, it is understood that different but equivalent functional arrangements may be used.

In order to reduce the burden to a host environment's host processor, it is desirable to avoid interrupting the host processor too frequently (such as for each received unit (e.g., Ethernet packet or other basic transmitted data structure) of network traffic received by a network interface). However, it is also desirable to recognize that certain data transfers require immediate assistance of the host environment. Examples include receiving bursts of data from a particular network client, or when there is only one client communicating with the host. In these configurations, delaying interrupting the host can result in significant network delays. Off-loading work from the processor is most effective when there is a lot of network traffic.

In one embodiment, a main "timing" loop 100 serves as a central event loop for network processing, from which other features 102–106, processes, or activities are performed by the network interface. This loop serves as the endless processing cycle performed by the network interface. It is assumed that the network interface operates in a delayed interruption mode, unless some condition places the interface in a direct mode. During the direct mode, the host is immediately notified of received traffic units. During the delayed mode, a queue manager manages incoming network traffic, so that it is queued instead of presented to a host environment for processing. The queue manager stores (queues) incoming data until the host is interrupted to process the queued data. Queued traffic may be stored in memory on the network interface, or otherwise locally available to the interface. The loop maintains a time out counter. This time out is present to ensure that the host is interrupted at least as often as the time out period. On expiration of the timer period, host interrupt 102 is called, during which the host processor is interrupted and directed to process queued but as-yet-unprocessed network traffic.

Note that in some embodiments, features 102–106 may operate asynchronously to each other, with blocking/waiting as needed for thread synchronization, while in other embodiments, the components operate (except as noted, e.g., asynchronous DMA transfers) to the exclusion of the other. For ease of understanding, the latter single-processing configuration is assumed, so that the timer loop is considered suspended while the receive unit component 104 operates to process incoming network traffic. It will be understood by one in the art that these operations may operate in parallel to each other.

The processor of the network interface executes programming code which corresponds to the instructions necessary to perform components 100–106 as described herein. The code may be stored in a local non-volatile memory (e.g., E-PROM, PROM, ROM, Field Programmable Gate Array (FPGA), Flash Memory, or the like), and may be loaded into local volatile memory to enhance execution performance. The code may loaded into memory from over the network, such as through enabling code following a Bootstrap Protocol (BOOTP) or similar type of boot-strapping protocol.

On receipt of network traffic, the interface processor is interrupted from executing the timing loop to instead process received network traffic. This may in turn, as discussed below, result in queuing the unit for delayed processing by the host processor, or immediate interruption of the host. In either event, received network traffic is passed to a DMA write handler 106, which manages writing the data into host memory and interrupting the host. In one embodiment, there are two different handlers, one for delayed interruptions, and one for immediate interruptions.

Figure 2:
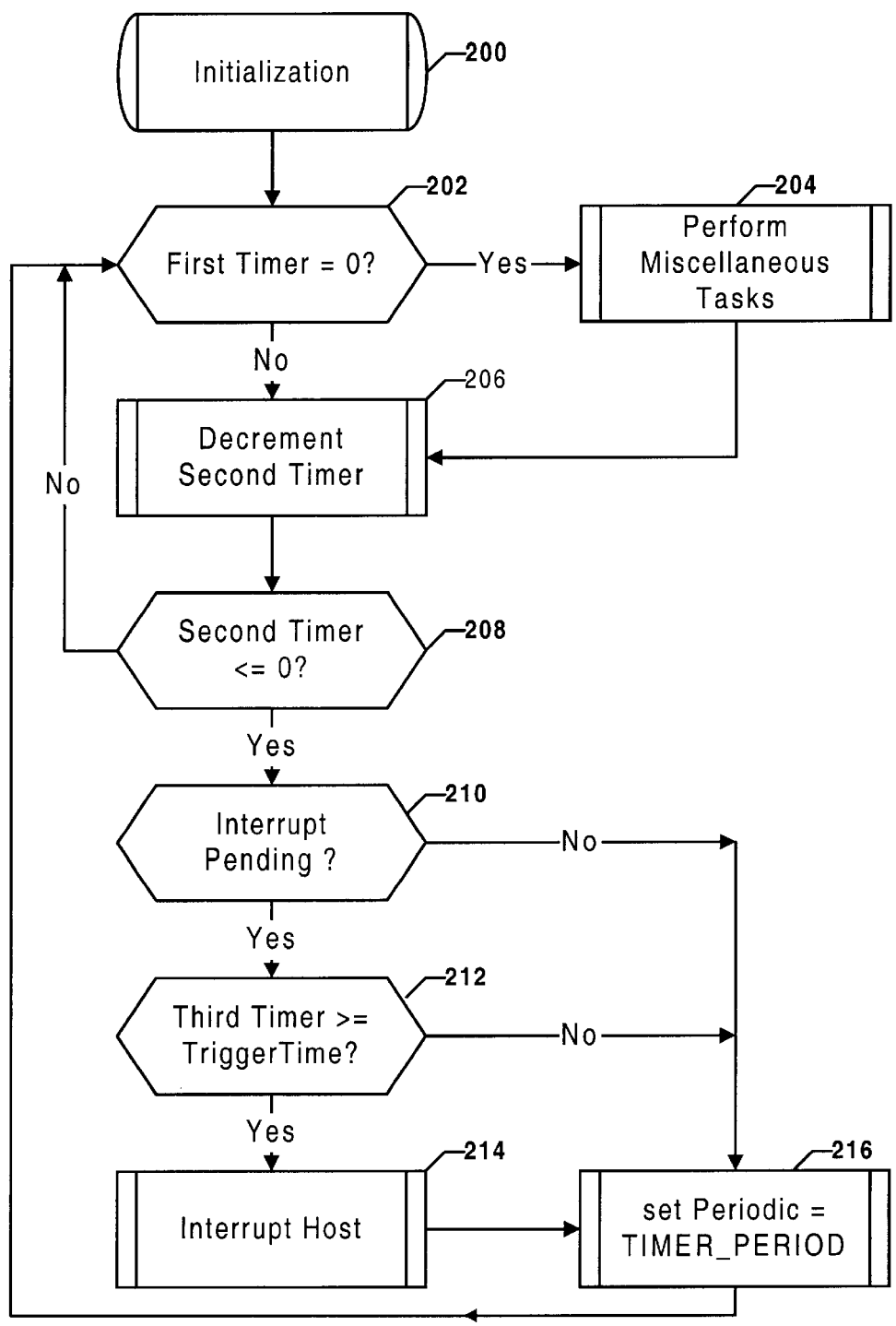
FIG. 2 illustrates a timing loop of FIG. 1 in accordance with one embodiment.

FIG. 2 illustrates the timing loop in more detail in accordance with one embodiment. As discussed above, this loop is assumed to be the overall processing cycle for the network interface. The first operation 200 is initialization of the network interface firmware. In one embodiment, the interface processor is an Intel i960Rx processor. Firmware initialization can include resetting the processor, and performing start up tasks such the i960Rx loading an initial memory image from storage, and loading an initial boot record for initializing other network interface components. When the i960 core processor initialization begins, the processor uses an Initial Memory Image to establish its state. The IMI (Initial Memory Image) includes: an IBR (Initialization Boot Record) which contains the addresses of the of the first instruction of the user's code and the PRCB; a PRCB (Process Control Block) which contains pointers to system data structures, as well as information to configure the processor at initialization; and System data structures cached by the processor at initialization.

Essentially, the timing loop corresponds to processing two different execution threads, where the loop alternates (not necessarily equally) between each thread of execution. The first execution thread corresponds to performance of other actions to be taken by the network interface that do not correspond to components 102–106 of FIG. 1. Towards this end, a test 202 is performed to determine whether a first timer has reached zero. If so, then processing continues with these other tasks 204.

After performing the other tasks of the first execution thread, or if the first timer had not tested 202 as zero, a second timer is decremented 206 and tested 208 for being less than or equal to zero. This second timer allows for a processing granularity between execution of features 102–106, e.g., it is used to simulate a quick periodic interval timer interrupt. Under some circumstances, the processing loop may execute much faster than is necessary to process data received by the network interface. Since there is no benefit to attempting to process data that has not been received yet, this provides for one method of stalling the timing loop. The period of this second timer may be fixed or dynamically adjusted according to received data patterns and interface load.

If the second timer was less than or equal to zero 208, then a check 210 is performed to determine whether an Interrupt Pending flag is true. When true, this means that the network interface has been delaying interrupts to the host environment's processor.

If interrupts are being queued (delayed), a third timer is compared 212 against a trigger time. This timer corresponds to the time out value for the timing loop, after which period the host is interrupted and directed to process any queued network traffic. This third timer tracks a "current time" for the interface. The trigger time corresponds to a future time at which the host is automatically interrupted irrespective of unit queuing status; as discussed above, forcing an interrupt guarantees a certain minimal granularity to host interrupts. This would be beneficial, for example, if a client machine were only sending a few units per trigger time interval;

under a delayed approach, the host environment might not receive any interrupts for some time, and the client would therefore fail to receive a response from the server, at least within a reasonable time frame.

Thus, if the current time exceeds the trigger time, then a timer-expiration host interrupt (see FIG. 3) is executed 214, and the second timer reset 216 (recall it is presently at zero). Otherwise the second timer is simply reset 216 and processing continues again with checking 202 the first timer.

Figure 3:
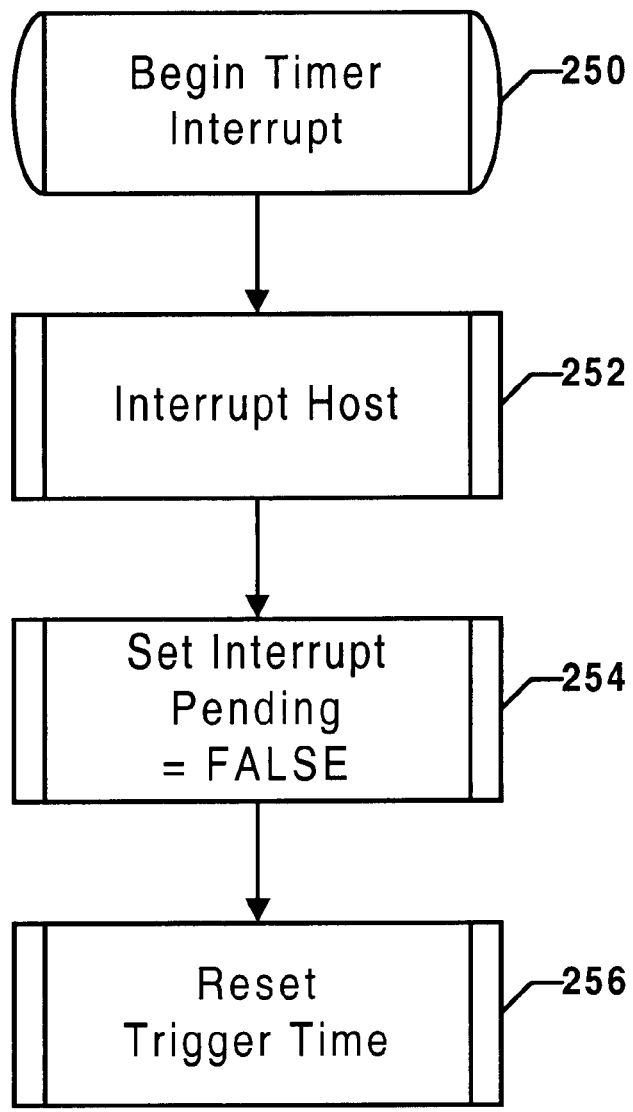
FIG. 3 illustrates a host interrupt called on expiration of the FIG. 2 timeout loop in accordance with one embodiment.

FIG. 3 illustrates the timer-expiration host interrupt 102 in more detail in accordance with one embodiment. As discussed above for FIG. 2, a current time value is compared 212 to a trigger time. If the current time exceeds the trigger time, then the timer interrupt begins 250. The first operation is to generate 252 a received-data complete interrupt to the host environment's host processor. The host environment is now made aware of network traffic units (e.g., Ethernet packets or the like) that have been received by the network interface, and the host processor is now directed to process them. As discussed above, when the network interface is in delayed interruption mode, there may be several units queued for processing. But, there were not enough received units to cause an interrupt based on the number of units received—hence this interrupt is based on the timeout comparison 212 of the current time against the trigger time.

After generating the host interrupt, the Interrupt Pending flag is set 254 to false to indicate that the network interface does not have any queued network traffic, since the interrupt caused any queued traffic to be processed by the host environment.

After resetting 254 the flag, the next Trigger Time is set 256. As used in FIG. 2 item 212, the trigger time indicates a default period at which point all queued network traffic units are immediately delivered to the host environment by generating a host interrupt. This in turn causes all of these traffic units to be processed by the host environment's host processor. The Trigger Time can be implemented as an increasing target to be met by the Third Timer, e.g., the Third Timer can track a "current time" and the Trigger Time set to a future time. In this configuration, at item 256, the Trigger Time is "set" by loading it with the value of "current time"+an interrupt interval (e.g., the delay period until the next timeout). Alternatively, the Third Timer can operate as a threshold timer, e.g., incremented until it exceeds a Trigger Time threshold value.

Figure 4A:
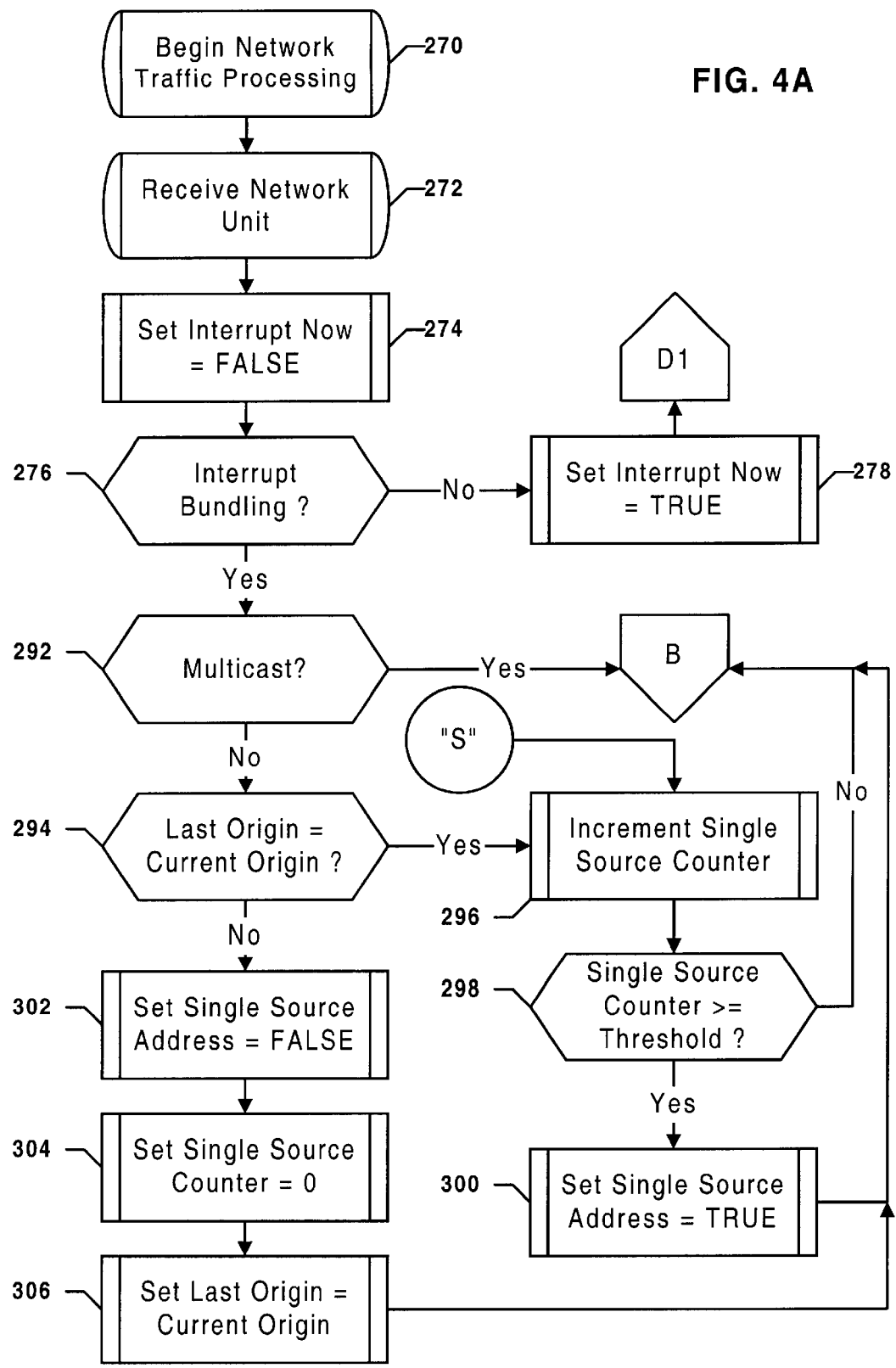
FIGS. 4A, 4B illustrate receiving a unit of network traffic by a network interface in accordance with one embodiment.
Figure 4B:
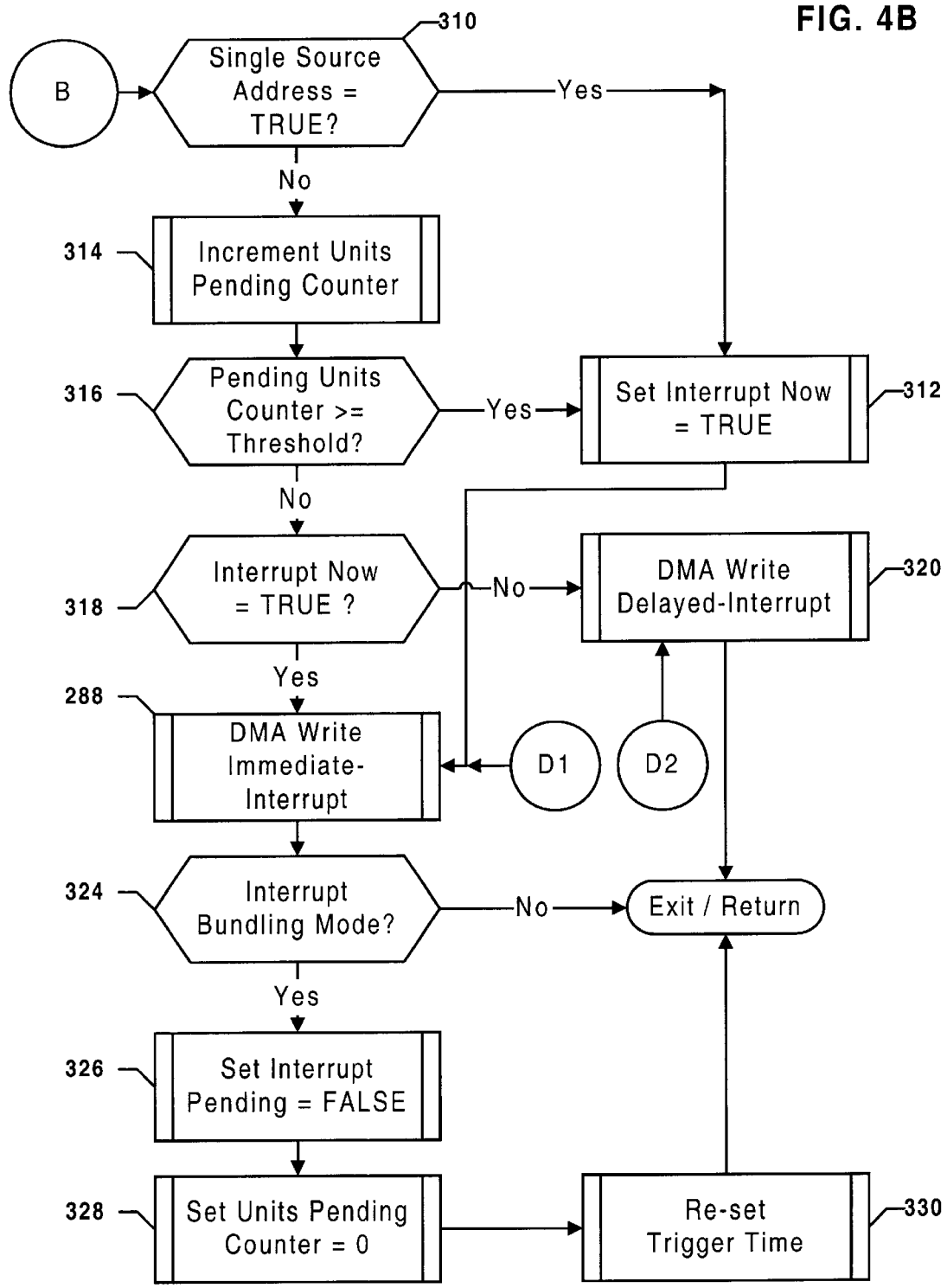

FIGS. 4A, 4B illustrate the receive unit interrupt loop 104 in more detail in accordance with one embodiment. As discussed above, when in a delayed interrupt mode, the network interface delays interrupting the host environment's processor until a certain number of units have been received. Notwithstanding the delay, FIGS. 4A, 4B are performed for each network traffic unit (e.g., Ethernet packet or the like) received by the network interface. In particular, the processor on the network interface is interrupted as network traffic units are received by the interface.

After the network interface completes its initialization 200 (FIG. 2), the network interface begins traffic processing 270 due to hardware interrupts received from the Ethernet controller. The receive traffic loop waits until a network traffic unit has been received 272 from a network to which the network interface is connected. The received unit is then initially processed by the network interface. For example, initial processing includes stripping off network headers, checking for unit errors, filtering the unit against discard filters (e.g. the interface may be configured to ignore certain network traffic), and statistical checks such as maintaining counts of received units, bytes received, errors, types of errors, etc.

If the received unit was not discarded after initial processing, then an Interrupt Now flag is set 274 to false. This flag identifies what type of interrupt mode the unit interrupt loop will utilize. When set false, it indicates that interrupts are being delayed, and when true, it indicates that the host is to be interrupted as will be described below. Initially the flag is set to false on assumption that interrupts will be delayed.

Figure 5A:
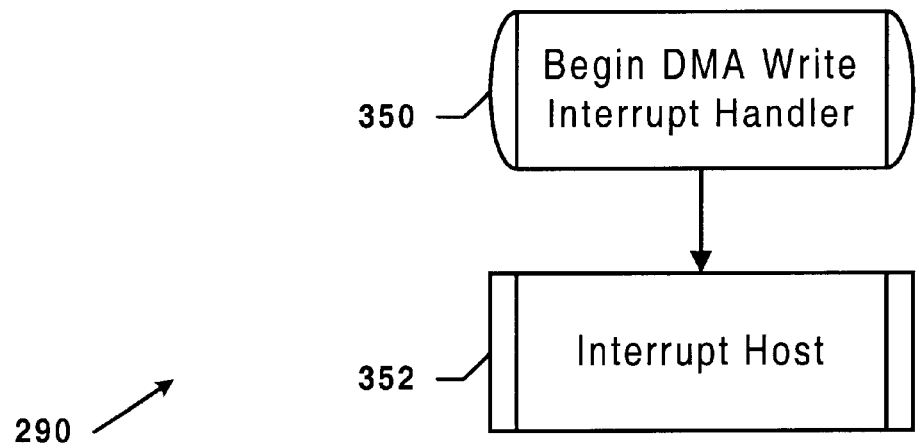
FIGS. 5A, 5B illustrate DMA write handlers for immediate and delayed interruption of the host in accordance with one embodiment.

The next operation checks 276 whether the network interface is operating in Interrupt Bundling mode. In effect, this verifies whether the default false state of the Interrupt Now flag is accurate. If the network interface is not operating in an interrupt bundling mode, then the flag is set true 278, and this corresponds to interrupting the host processor as each network traffic unit is received. After setting the flag to true, execution continues with initialization of a DMA write 288 (FIG. 4B) of the received traffic unit to system memory. To prevent network interface blocking, the DMA is initialized with a callback interrupt to a Write Unit Complete callback function 290 (FIG. 5A). The DMA write operation occurs in parallel to the network interface and host processor processing. When it completes, the network interface processor is interrupted to begin processing the callback function. In the meantime, after initiating the DMA write operation, processing continues with the FIG. 2 timing loop.

If the check 276 indicates that the network interface is operating in an interrupt bundling mode, a check 292 is performed to determine whether the received network traffic unit contains a multicast address bit. (Multicast transmissions are communications between a single sender and multiple network recipients; network interfaces maintain a table of multicast addresses to which they should pay attention.) If the multicast bit is set, then processing continues with FIG. 4B item 310. If the multicast bit is not set, then a further check 294 is performed to determine whether the source address of the previously received traffic unit matches the source address of the current (just received) traffic unit.

If the previous and current unit origins match, then a Source Address counter (counting consecutive units having same origin) is incremented 296, and the counter is compared 298 against a single source threshold. If the Source Address counter equals or exceeds the threshold, then a Single Source Address flag is set true 300. (Note it is assumed the Single Source Address flag has a default false value.) This flag indicates to the rest of the system that a predetermined number of units have been consecutively received from a particular source (The predetermined value has no particular value, as it should be set according to the speed/capabilities of the network interface). Note that alternatively one can measure whether a certain high-percentage (e.g., 99%) of traffic units have been received from a single source, as this allows for a few extraneous network traffic units to be received without interrupting the determination that most data is coming from a single source. Processing then continues with FIG. 4B item 310.

If the previous and current unit origins do not match, then the Single Source Address flag is set false 302, and the Source Address counter is reset to zero 304. The current unit origin is then saved 306 for comparison against a subsequently received traffic unit, and processing continues with FIG. 4B item 310.

In FIG. 4B, the first illustrated operation is a check 310 to determine whether the Single Source Address is true (recall, default is false). Checking for an origin of network traffic is beneficial under certain circumstances, such as when there is only a single client talking to a server, and the server is using a network interface which attempts to delay interrupting the server on receipt of network traffic units. As discussed above, this scenario may result in the client receiving degraded service from the server. Consequently, the Single Source address flag is used to override interrupt bundling modes which delay reporting receipt of network traffic units.

If the check 310 indicates Single Source traffic, then the Interrupt Now flag is set 312 to true, and processing continues as discussed above with initialization of a DMA write 288 of the received traffic unit to system memory (see FIG. 5A). If the Single Source traffic is false, then a Received Units Pending counter is incremented 314, and a check 316 performed to determine whether Received Units Pending equals or exceeds a predetermined threshold (e.g., 10 units; there is no actual minimum or maximum value, as it depends on the speed/capabilities of the network interface). If the pending counter equals or exceeds the threshold, then instead of continuing to queue received traffic units, the Interrupt Now flag is instead set 312 so that processing continues with initiating a DMA write 288 to system memory that also interrupts the host processor (see FIG. 5A).

This test of the Received Units Pending counter forms a third "major" method by which interrupts are generated to the host processor. The first major method is when the timing loop timer timed out (FIG. 2), and the second major method is when single source addressing was detected 298. This third event is when a sufficient quantity of delayed traffic units have been received and queued for host processing. There may also be other reasons to cause the host processor to be interrupted. For example, received traffic units marked urgent or special can cause an immediate interrupt of the host processor.

If the check 316 indicates Received Units Pending do not exceed the predetermined threshold, then the Interrupt Now flag is checked 318 to see if this flag is true, thus requiring an immediate interrupt of the host processor.

If 318 Interrupt Now the flag is false, then processing continues with initialization of a DMA write 320 of the received network traffic to system memory. As with the previously described DMA write 288, the DMA is initialized with a callback interrupt to an Interval Write Unit Complete callback function 312 (see FIG. 5B), allowing asynchronous DMA operation. Processing control returns to the FIG. 2 timing loop, until the DMA completes, where the network interface processor is again interrupted to process the callback function. However, unlike the previously discussed DMA write 288, on copying the received traffic to a memory, the host is not yet notified that network traffic has been received. Thus, the received network traffic can be queued to system memory without a corresponding host environment interruption.

If 318 the Interrupt Now flag is true, then execution continues with the previously discussed initialization of a DMA write 288 of the received traffic unit to system memory (see also FIG. 5A). After initializing the DMA write, instead of immediately returning to the FIG. 2 timing loop (as performed by delayed DMA 320), a check 324 is performed to determine whether the network interface is operating in an interrupt bundling mode, e.g., delaying interrupting the host. If the test fails, i.e., the network interface is not in interrupt bundling mode, then execution continues with the timing loop (FIG. 2).

However, if the interface is in interrupt bundling mode, then cleanup activities are performed to account for having initiated a host processor interrupt in a delayed interrupt mode. These cleanup activities include setting 326 the Timer Interrupt Pending flag (e.g., no interval DMA write is in progress; see FIG. 5B) to false, resetting 328 the Received Units Pending counter to zero, and resetting 330 the Trigger Time for the next received traffic unit interrupt. The Trigger Time, as discussed above for FIG. 2, is the next time period at which time the host environment's host processor is interrupted to cause it to process queued network traffic units.

Figure 5B:
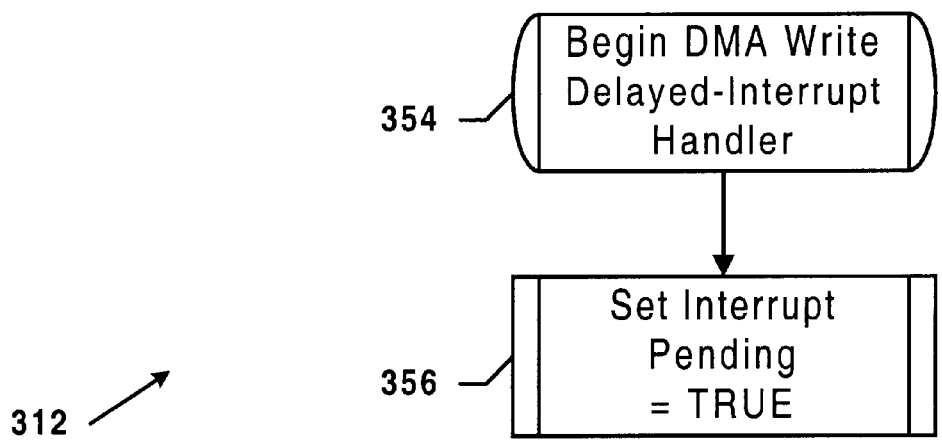

FIGS. 5A, 5B illustrate the DMA write handlers discussed in FIG. 1 (item 106) and FIGS. 4. FIG. 5A illustrates the DMA Write routine 290 that is responsible for copying received network traffic units from local memory associated with a network interface (e.g., the interface calling this routine in FIG. 4B) to system memory. As illustrated, the DMA handler starts at its entry point 350 for the callback operation. Recall that a DMA operation was initiated previously (see, e.g., FIG. 4B item 288), and this handler has been called when the DMA transfer to system memory has already completed. Consequently, the first operation to perform is generating 352 an interrupt to the host processor of the host environment to cause it to process the received traffic units that were DMA'd into the host's memory. As discussed above, there can be several reasons for calling this handler, such as meeting certain threshold requirements, or due to burst data from a particular client on the network. And, since this handler interrupted the network interface's processing of the timing loop of FIG. 2, after sending the interrupt to the host, the callback handler exits and processing continues in FIG. 2.

FIG. 5B illustrates the DMA Write routine 312 that called when interrupts are being delayed. Consequently, after starting 354 the delayed interrupt handler, the first operation to perform is to set 356 the Interrupt Pending flag to true, to indicate that a delayed transaction is in progress, e.g., that one or more network traffic units have been written to system memory, but the host has not been notified of this yet. And, since this handler also interrupted the FIG. 2 timing loop, after setting the flag, the callback handler exits and processing continues in FIG. 2.

The following discussion is intended to provide a brief, general description of a suitable computing environment in which portions of the claimed invention may be practiced in accordance with one embodiment. The invention may be described by reference to different high-level program modules and/or low-level hardware contexts. Program module references can be interchanged with low-level hardware instructions. Program modules include procedures, functions, programs, and the like, that perform particular tasks or implement particular abstract data types. Modules may be incorporated into single and multi-processor computing systems, as well as hand-held devices and consumer devices. It is understood that modules may be implemented on a single computing device, or processed over a distributed network environment, and they can be located in both local and remote memory storage.

An exemplary system for implementing appropriate portions of one embodiment the invention includes a computing device having system bus for coupling together various components within the computing device. The system bus may be any of several types of bus structure including a memory bus or memory controller, a peripheral bus, and a local bus using any of a variety of conventional bus architectures such as the Peripheral Component Interconnect (PCI) bus, Industry Standard Architecture (ISA), Accelerated Graphics Port (AGP) (this port is typically used for graphics, but it can be used to carry high-volume network traffic), Extended Industry Standard Architecture (EISA), Micro Channel Architecture (MCA), NuBus (Macintosh), Personal Computer Memory Card International Association (PCMCIA or PC Card bus), Small Computer System Interface (SCSI), VESA Local-Bus (VL Bus), VersaModule Eurocard (VME), to name a few. Note that only a single bus is illustrated, although plural buses typically achieve performance benefits.

Typically, attached to the bus are a processor, a memory, storage devices such as fixed, removable or optical/laser storage, a video interface, input/output interface ports, and a network interface. One skilled in the art will recognize that the present description frequently references hardware components from the perspective of the networking interface, hence computing device and other components are the host environment for interface. The network interface, as discussed above, may have an embedded processor, memory and other related structure not shown.

The processor may be any of various commercially available processors, including Intel processors, or the DEC Alpha, PowerPC, programmable gate arrays, signal processors, or the like. Dual, quad processors, and other multi-processor architectures also can be used. The memory includes random access memory (RAM), static or re-programmable read only memory (ROM), and the like. A basic input/output system (BIOS), stored in ROM, or an operating system, stored in ROM or other storage, contains routines for information transfer between device components or device initialization.

Fixed storage generally refers to hard drive and other semi-permanently attached media, whereas removable storage generally refers to a device-bay into which removable media such as a floppy diskette is removably inserted. Optical/laser storage includes devices based on CD-ROM, DVD, CD-RW, or other optical/laser technologies. Storage is usually coupled to the system bus through a device interface. The storage systems and associated computer-readable media provide storage of data and executable instructions for the computing device. Note that other storage options include magnetic cassettes, tapes, flash memory cards, memory sticks, digital video disks, and the like.

The exemplary computing device can store and execute a number of program modules within the memory and the storage. Typical program modules include an operating system, application programs (e.g., a web browser or network application), etc., and application data. Program module or other system output can be processed by the video system (e.g., a 2D and/or 3D graphics rendering device), which is coupled to the system bus, and an output device. Typical output devices include monitors, flat-panels displays, liquid-crystal displays, and recording devices such as video-cassette recorders.

The computing device may load and execute any one of a number of operating systems, such as Microsoft Windows, Novell NetWare, or Unix. A user of the computing device is typically a person or artificial intelligence (e.g., expert system) interacting with the computing device through manipulation of an input device. For a person, common input devices include a keyboard, mouse, tablet, touch-sensitive surface, digital pen, joystick, microphone, game pad, satellite dish, etc. Input can also be provided through manipulation of a virtual reality environment, or by processing the output from a data file or another computing device.

The computing device is expected to operate in a networked environment using logical connections to one or more remote computing devices. Such remote devices may be a web server or program utilizing a network application protocol (e.g., HTTP, File Transfer Protocol (FTP), Gopher, Wide Area Information Server (WAIS)), a router, or a peer device or other common network node. Remote devices typically include many or all of the elements discussed for the computing device. As discussed above, the computing device has a network interface, such as an Ethernet card having an associated MAC address. This interface is coupled to the system bus to facilitate communication with the remote devices. Both the local and remote computing devices can be communicatively coupled to a network such as a WAN, LAN, Gateway, Internet, or other public or private data-pathway. Or there can be other links between the computing devices, such as through a modem or other communication medium coupled to an interface port of a computing device.

In accordance with the practices of persons skilled in the art of computer hardware and software programming, the present invention is described with reference to acts and symbolic representations of operations that are sometimes referred to as being computer-executed. It will be appreciated that the acts and symbolically represented operations which include manipulation by the processor of electrical signals representing data bits, which cause a resulting transformation or reduction of the electrical signal representation, and the maintenance of data bits at memory locations in the memory and storage, so as to reconfigure or otherwise alter the computer system's operation and/or processing of signals.

Having described and illustrated the principles of the invention with reference to illustrated embodiments, it will be recognized that these embodiments can be modified in arrangement and detail without departing from such principles. And, even though the phrases "in an embodiment", "in one embodiment", "in a preferred embodiment", or the like may be used herein, it is understood that these embodiments may be split or combined into one or more different embodiments. Consequently, in view of the wide variety of possible invention embodiments, the detailed embodiments are intended to be illustrative only, and should not be taken as limiting the scope of the invention. Instead, what is claimed as the invention is all such modifications as may come within the scope and spirit of the following claims and equivalents thereto.

What is claimed is:

1. A method, comprising:
   queuing a first network traffic unit having an associated origin;
   receiving a second network traffic unit having an associated origin, and receiving subsequent network traffic units each having an associated origins;
   comparing said origins of said first and second network traffic units; and
   if said origins differ, then queuing said second unit, else interrupting a host processor for the first unit and the second unit, and interrupting the host processor for each one of the subsequent network traffic units consecutively received after the second network traffic unit if said subsequent network traffic units are determined to be substantially received from said origin of said second network traffic unit.

2. A method according to claim 1, further comprising:
   executing a repeating timeout loop;
   counting queued network traffic units;
   interrupting the host processor on timeout of said loop to process each queued network traffic unit; and interrupting the host processor if said counting exceeds a predetermined threshold.

3. An article of manufacture comprising a computing-device readable medium having encoded thereon instructions to direct a processor to perform the operations of:

queuing a first network traffic unit having an associated origin;

receiving a second network traffic unit having an associated origin, and receiving subsequent network traffic units each having an associated origins;

comparing said origins of said first and second network traffic units; and if said origins differ, then queuing said second unit, else interrupting a host processor for the first unit and the second unit, and interrupting the host processor for each one of the subsequent network traffic units consecutively received after the second network traffic unit if said subsequent network traffic units are determined to be substantially received from said origin of said second network traffic unit.

4. An article of manufacture according to claim 3, further comprising instructions to perform the operations of:

executing a repeating timeout loop;

counting queued network traffic units;

interrupting the host processor on timeout of said loop to process each queued network traffic unit; and interrupting the host processor if said counting exceeds a predetermined threshold.

5. A system comprising:

a queue for queuing network traffic units;

a network interface for receiving at least a first network traffic unit having an associated origin and a subsequent network traffic unit having an associated origin;

a comparator communicatively coupled with the network interface for comparing said origins of the first network traffic unit and the subsequent network traffic unit to determine if said origins differ; and a queue manager operable to queue the first network traffic unit and the subsequent network traffic unit in the queue if said origins differ, and if said origins do not differ, to interrupt a host processor for the queued first network traffic unit and the subsequent network traffic unit, and interrupting the host processor for each unit of subsequently immediately following network traffic units received from the second origin.

6. The system of claim 5, further comprising:

a timer for measuring an elapsed time since said interrupting the host processor to process network traffic units, wherein the queue manager is configured to interrupt the host processor to process said queued network traffic units if the elapsed time exceeds a threshold.

7. The method of claim 1, wherein queuing network traffic units includes storing the network traffic units in a memory without interrupting the host processor.

8. The method of claim 1, further comprising:

executing a repeating timeout loop; and interrupting the host processor on timeout of said loop to process each queued network traffic unit.

9. The method of claim 1, further comprising:

counting queued network traffic units; and interrupting the host processor if said counting exceeds a predetermined threshold.

10. An article of manufacture according to claim 3, wherein said instructions for queuing network traffic units further comprises instructions to perform the operations of:

storing the network traffic units in a memory without interrupting the host processor.

11. An article of manufacture according to claim 3, wherein said instructions further comprises instructions to perform the operations of:

executing a repeating timeout loop; and interrupting the host processor on timeout of said loop to process each queued network traffic unit.

12. An article of manufacture according to claim 3, wherein said instructions further comprises instructions to perform the operations of:

counting queued network traffic units; and interrupting the host processor if said counting exceeds a predetermined threshold.

13. The system of claim 5, wherein the queue manager operating to queue network traffic units includes storing the network traffic units in a memory without interrupting the host processor.

14. The system of claim 5, further comprising:

a timer communicatively coupled with the queue manager, wherein the queue manager is further operable to start the timer and interrupt the host processor after an elapsed time to process each queued network traffic unit.

15. The system of claim 5, further comprising:

a counter communicatively coupled with the queue manager for counting queued network traffic units, wherein the queue manager is further operable to interrupt the host processor if said counting exceeds a predetermined threshold.

* * * * *

UNITED STATES PATENT AND TRADEMARK OFFICE
CERTIFICATE OF CORRECTION

PATENT NO. : 6,760,799 B1
DATED : July 6, 2004
INVENTOR(S) : Dunlap et al.

It is certified that error appears in the above-identified patent and that said Letters Patent is hereby corrected as shown below:

Column 10,
Line 51, delete "origins" and insert -- origin --.

Column 11,
Line 10, delete "origins" and insert -- origin --.

Signed and Sealed this

Twenty-first Day of September, 2004

JON W. DUDAS
*Director of the United States Patent and Trademark Office*